April 13, 1965
C. W. GALUSKA
3,177,841
FILTERED WATER LUBRICATING SYSTEM
FOR PROPELLER SHAFT BEARING
Filed July 18, 1963
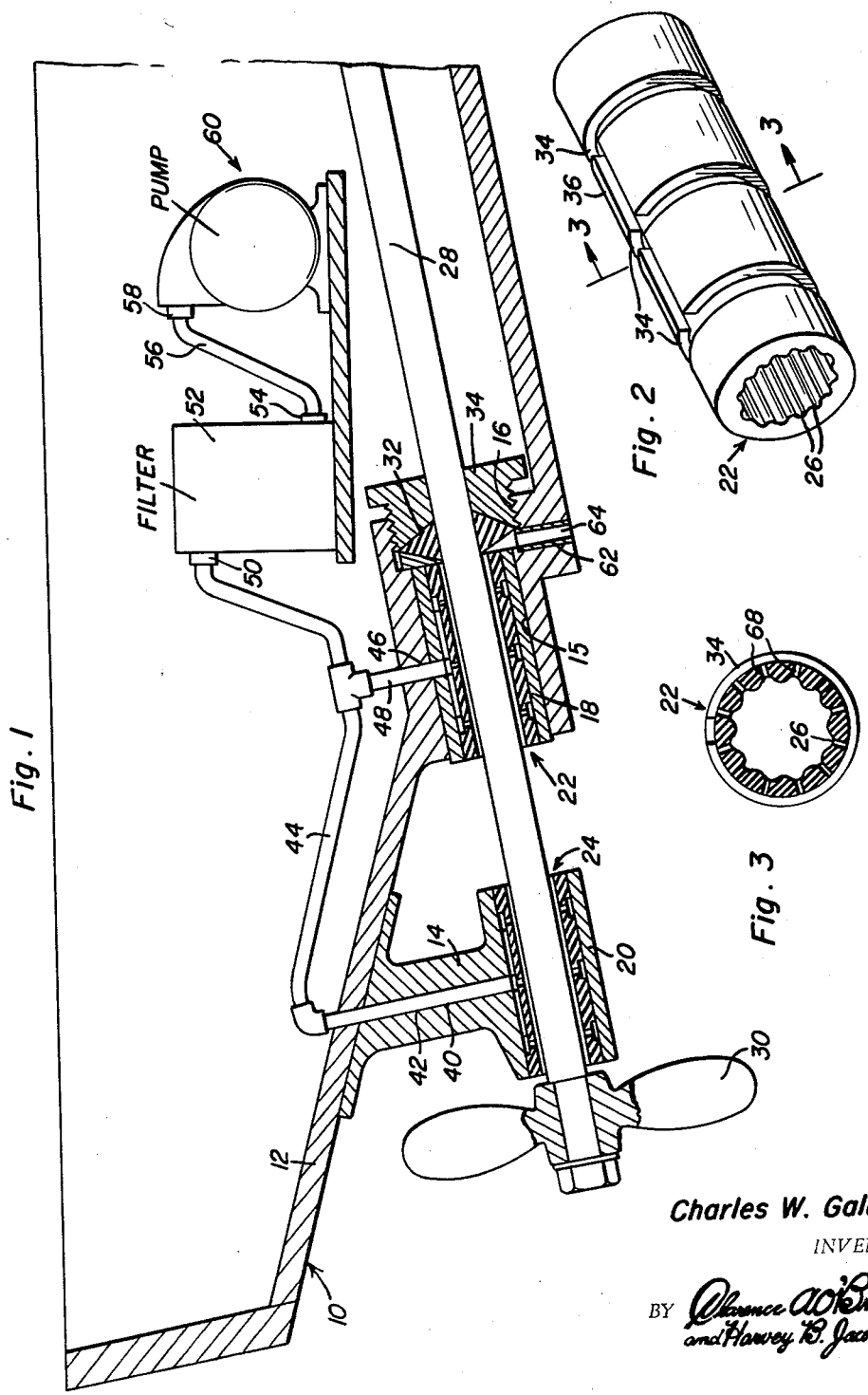
Charles W. Galuska
INVENTOR.

United States Patent Office 3,177,841
Patented Apr. 13, 1965

3,177,841
FILTERED WATER LUBRICATING SYSTEM FOR PROPELLER SHAFT BEARING
Charles W. Galuska, San Jose, Calif., assignor of twenty-five percent to Lois Edwards and twenty-five percent to Kathy Edwards, both of San Jose, Calif.
Filed July 18, 1963, Ser. No. 295,960
5 Claims. (Cl. 115—34)

This invention relates to a novel and a useful filtered water lubricating system for propeller shaft bearings and more specifically to a system whereby filtered water may be pumped under pressure to propeller shaft cutlass bearings to lubricate the latter.

Propeller shaft cutlass bearings are provided with internal longitudinally extending grooves which allow free passage of water through the bearing in order to lubricate the latter. However, cutlass bearings utilize the ambient water for lubricating purposes and in some instances this water carries a large amount of foreign material such as silt, sand, particles of mud and various other abrasive materials. If a boat is operated in shallow water, and especially if the boat is jockeyed back and forth, a large quantity of mud and/or sand will be passed through the cutlass bearings and this foreign material will of course decrease the bearing life.

The filtered water lubricating system of the instant invention is designed to receive water from the exterior of the boat and to pass the same through a pump and then through a filter. After passing through a filter to remove the majority of foreign material in the water, the water is then ducted by means of suitable conduits to the cutlass bearings in a manner whereby the pressure of the lubricating filtered water will prevent the entrance of unfiltered water into the bearings. In this manner, the life of cutlass bearings of boats operating in shallow water and under other circumstances where foreign material usually passes through the cutlass bearings is greatly increased.

The lubricating system of the instant invention has also been specifically adapted to function in connection with cutlass bearings utilized as stern tube bearings. Inasmuch as a stern tube bearing must necessarily have one end sealed relative to the shaft which is journaled thereby in order to prevent water from passing into the hull through which the propeller shaft extends, the lubricating system of the instant invention includes a modified stern tube cutlass bearing including vent means disposed between the cutlass bearing and the shaft stuffing conventionally associated therewith.

The main object of this invention is to provide a filtered water lubricating system for propeller shaft bearings such as cutlass bearings whereby the passage of foreign material through these bearings will be greatly eliminated and the life of these bearings will be greatly extended.

Another object of this invention is to provide a water lubricating system for propeller shaft bearings and designed in a manner whereby it may be readily incorporated into the manufacture of new boats as well as boats presently in use.

Still another object of this invention is to provide a water lubricating system for cutlass bearings and the like utilizing filtered water and including structural features which will enable the filtered water within the bearings being lubricated thereby to be under a pressure greater than that of the ambient water whereby the entrance of the ambient water into the cutlass bearings will be substantially eliminated.

A final object of this invention to be specifically enumerated herein is to provide a filtered water lubricating system for propeller shaft bearings in accordance with the preceding objects which will conform to conventional forms of manufacture, be of simple construction and easy to operate so as to provide a device of the economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary longitudinal vertical sectional view taken substantially upon a plane passing through the longitudinal center line of a boat showing the manner in which the filtered water lubricating system of the instant invention may be operatively associated with the cutlass bearing assemblies for the propeller shaft of the boat;

FIGURE 2 is a perspective view of a propeller shaft cutlass bearing constructed in accordance with the present invention;

FIGURE 3 is a transverse sectional view taken substantially upon a plane indicated by the section line 3—3 of FIGURE 2.

Referring now more specifically to the drawings the numeral 10 generally designates a conventional form of boat hull which includes a bottom 12 from which a propeller shaft supporting strut 14 is dependingly supported. In addition, the bottom 12 defines a rearwardly and downwardly inclined bore 15 including a diametrically enlarged and internally threaded inner end portion 16 and having a bearing supporting sleeve 18 secured therein in a convenient manner.

The lower end of the propeller shaft supporting strut 14 defines a sleeve portion 20 which is aligned with the sleeve 18. A pair of cutlass bearings generally referred to by the reference numerals 22 and 24 are disposed in the sleeve 18 and the sleeve portion 20, respectively, and it may be seen from FIGURES 1-3 of the drawings that each of the bearings 22 and 24 is generally cylindrical in configuration and constructed of resilient material.

Each of the bearings 22 and 24 is provided with a plurality of internal and longitudinally extending grooves 26 and the bearings 22 and 24 rotatably journal a propeller shaft 28 at points spaced longitudinally thereof. The propeller shaft 28 has a propeller 30 mounted on its rear end for rotation therewith and suitable stuffing means 32 is secured in the bore end portion 16 by means of jamb nut 34 to provide a water-tight seal between the bottom 12 and the shaft 28.

With attention now invited to FIGURE 2 of the drawings, it may be seen that each of the bearings 22 and 24 has a plurality of circumferential grooves 34 formed in its outer surfaces and that the grooves 34 are spaced longitudinally of the bearings 22 and 24 and axially from their opposite ends. In addition, each of the bearings 22 and 24 includes a longitudinal groove 36 in its outer surfaces which communicate the circumferential grooves 34.

The strut 14 has a bore 40 formed therein which opens upwardly through the bottom 12 and downwardly into the sleeve portion 20 in registry with the corresponding longitudinal bore 36. A water inlet pipe 42 extends through the bore 40 and is communicated with a manifold tube 44 at its upper end. In addition, the bottom 12 has an upstanding bore 46 formed therein which opens downwardly through the sleeve 18 at its lower end and upwardly through the bottom 12 at its upper end. A pipe 48 extends through the bore 46 and is communicated with the manifold tube 44 at its upper end.

The manifold tube 44 is communicated with an outlet fitting 50 of a filter assembly 52 at its inlet end and the filter assembly 52 includes an inlet fitting 54 with which the outlet end of a delivery pipe 56 is communicated. The inlet end of the delivery pipe 56 is communicated with the outlet fitting 58 of a water pump generally referred to by the reference numeral 60 and it is to be understood that the water pump 60 includes an inlet (not shown) which opens through the bottom of the boat hull 10.

The water pump 60 may be driven by any suitable means such as a power take-off from a conventional marine engine (not shown) disposed in the boat hull 10 and therefore will be placed in operation whenever the propeller shaft 28 is rotating.

The bottom 12 also includes a bore 62 which opens through the bottom at its lower end and upwardly into the counter bore 16 between the stuffing means 32 and the inner end of the bearing 22. Thus, the bore 62 which snugly receives an outlet tube 64 vents the inner end of the bearing 22 to the ambient water.

In operation, when the pump 60 is operating water delivered therefrom passes through the filter assembly 52 and into the longitudinal grooves 36 of the bearings 22 and 24. It is to be understood that discharge from the pump 60 is sufficient to create enough pressure in the grooves 34 and 36 of the bearings 22 and 24 to prevent the ambient water from entering the bearings. In this manner, clean filtered water will be utilized to lubricate bearings 22 and 24 and in a manner which will prevent the entrance of the ambient water into the bearings 22 and 24.

As can best be seen in FIGURE 3 of the drawings each of the bearings 22 and 24 includes a plurality of generally radial bores 68 which communicate the grooves 34 with the grooves 26 and thereby enable free passage of clean filtered water from the grooves 34 to the grooves 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a boat hull including bottom means defining a propeller shaft stern tube bearing receiving bore extending therethrough, a cylindrical shaft bearing snugly received in said bore, said bearing having inner longitudinal grooves formed in its inner surfaces, a plurality of communicated grooves formed in its outer surfaces spaced from its opposite ends, and including means communicating said outer grooves with said inner grooves, said bottom means including fluid inlet means opening into said bearing receiving bore at its outlet end and communicated with at least one of said outer grooves, the inner end of said bearing being spaced outwardly of the inner end of said bore, shaft stuffing means secured in the inner end of said bore, means in said hull for drawing water into said hull from the exterior thereof and independently of said longitudinal grooves, filtering said water, and then delivering the filtered water to said fluid inlet means under pressure, and said bottom means including fluid outlet means communicating the inner end of said bore between said bearing and said stuffing means with the exterior of said hull.

2. In combination with a boat hull including bottom means defining a propeller shaft stern tube bearing receiving bore extending therethrough, a cylindrical shaft bearing snugly received in said bore, said bearing having inner longitudinal grooves formed in its inner surfaces, said bottom means including fluid inlet means opening into said bearing receiving bore at its outlet end said bearing receiving bore and said bearing including coacting means communicating said inlet means with at least one of said longitudinal grooves, the inner end of said bearing being spaced outwardly of the inner end of said bore, shaft stuffing means secured in the inner end of said bore, means in said hull for drawing water into said hull from the exterior thereof and independently of said longitudinal grooves, filtering said water and then delivering the filtered water to said fluid inlet means under pressure, and said bottom means including fluid outlet means venting the area of said bore between said bearing and said stuffing means.

3. In combination with a boat hull including bottom means defining a propeller shaft stern tube bearing receiving bore extending therethrough, a cylindrical shaft bearing snugly received in said bore, said bearing having inner longitudinal grooves formed in its inner surfaces, a plurality of communicated grooves formed in its outer surfaces spaced from its opposite ends, and including means communicating said outer grooves with said inner grooves, said bottom means including fluid inlet means opening into said bearing receiving bore at its outlet end and communicated with at least one of said outer grooves, the inner end of said bearing being spaced outwardly of the inner end of said bore, means in said hull for drawing water into said hull from the exterior thereof and independently of said longitudinal grooves, filtering said water and then delivering the filtered water to said fluid inlet means under pressure, shaft stuffing means secured in the inner end of said bore, and said bottom means including fluid outlet means communicating the inner end of said bore between said bearing and said stuffing means with the exterior of said hull, said bottom means also including a propeller shaft supporting strut defining a sleeve portion in which a second cylindrical shaft bearing is snugly received and supported in alignment with said first mentioned bearing, said second bearing having inner longitudinal grooves formed in its inner surfaces, said strut having fluid inlet means formed therein communicated with the interior of said sleeve portion at its outlet end, the outer surfaces of said second bearing having a plurality of outer communicated grooves formed therein spaced from the opposite ends of said second shaft bearing, means communicating said inner and outer grooves of said second shaft bearing, at least one of said outer grooves of said second bearing being registered with the outlet end of the second mentioned fluid inlet means.

4. The combination of claim 1 wherein said means for drawing water into said hull includes a water pump in said hull including an outlet communicated with the inlet end of said fluid inlet means.

5. In combination with a boat hull including bottom means defining a propeller shaft stern tube bearing receiving bore extending therethrough, a cylindrical shaft bearing snugly received in said bore, said bearing having inner longitudinal grooves formed in its inner surfaces, a plurality of communicated grooves formed in its outer surfaces spaced from its opposite ends, and including means communicating said outer grooves with said inner grooves, said bottom means including fluid inlet means opening into said bearing receiving bore at its outlet end and communicated with at least one of said outer grooves, the inner end of said bearing being spaced outwardly of the inner end of said bore, shaft stuffing means secured in the inner end of said bore, and said bottom means including fluid outlet means communicating the inner end of said bore between said bearing and said stuffing means with the exterior of said hull, said bottom means also including a propeller shaft supporting strut defining a sleeve portion in which a second cylindrical shaft bearing is snugly received and supported in alignment with said first mentioned bearing, said second bearing having inner longitudinal grooves formed in its inner surfaces, said strut having fluid inlet means formed therein communicated with the interior of said sleeve portion at its outlet end, the outer surfaces of said second bearing having a plurality of outer communicated grooves formed therein spaced from the opposite ends of said second shaft bearing, means communicating said inner and outer grooves of said second shaft bearing, at least one of said outer grooves of said second bearing being registered with the outlet end of the second mentioned fluid inlet means, a water pump in said hull including an outlet communicated with the inlet end of said fluid inlet means associated with each of said bearings, and filter means disposed between said outlet and said inlet means.

References Cited by the Examiner
UNITED STATES PATENTS

| | | | |
|---|---|---|---|
| 2,306,664 | 12/42 | Scott-Paine | 115—34 X |
| 2,348,274 | 5/44 | Aker | 308—238 X |
| 2,625,448 | 1/53 | Underwood | 308—122 X |

FERGUS S. MIDDLETON, *Primary Examiner.*